R. H. F. STAGGE.
PIE CRIMPER AND CUTTER.
APPLICATION FILED APR. 18, 1921.
1,400,383.
Patented Dec. 13, 1921.
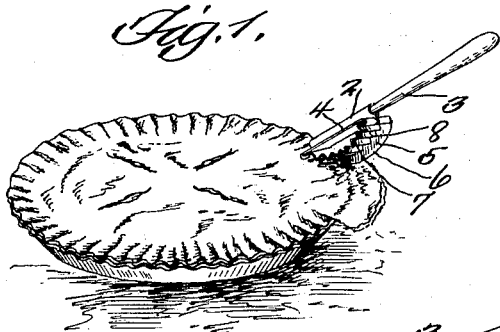
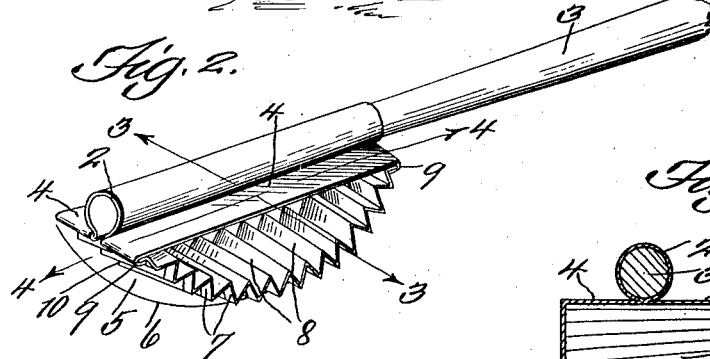
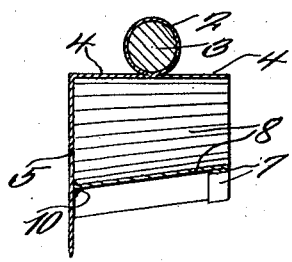
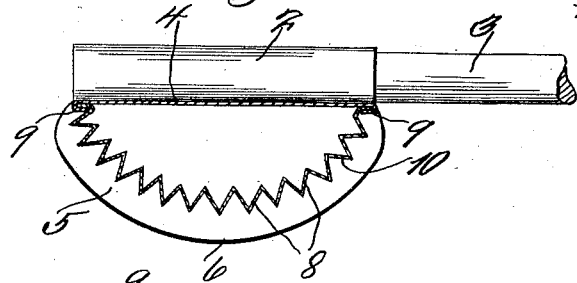
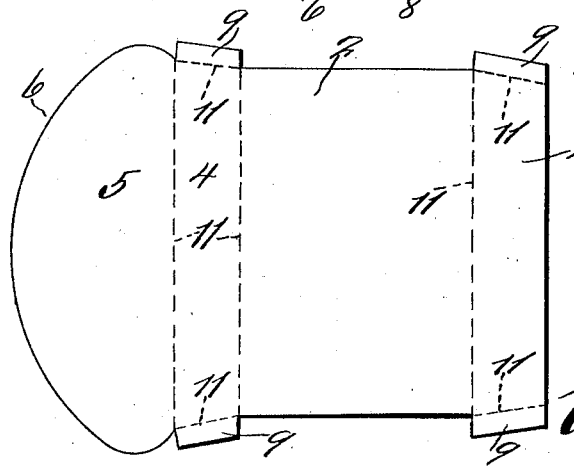
Inventor
Robert Stagge,
Watson E. Coleman
Attorney

UNITED STATES PATENT OFFICE.

ROBERT H. F. STAGGE, OF MADISONVILLE, OHIO.

PIE CRIMPER AND CUTTER.

1,400,383.   Specification of Letters Patent.   Patented Dec. 13, 1921.

Application filed April 18, 1921. Serial No. 462,296.

*To all whom it may concern:*

Be it known that I, ROBERT H. F. STAGGE, a citizen of the United States, residing at Madisonville, in the county of Hamilton and State of Ohio, have invented certain new and useful Improvements in Pie Crimpers and Cutters, of which the following is a specification, reference being had to the accompanying drawings.

The present invention has for its purpose the provision of a kitchen utensil, such as a pie crimper and cutter, particularly adapted for cutting the dough around the edge of the pie pan, and crimping the top crust to the bottom crust or dough, thereby eliminating the necessity of first cutting the dough from the edge of the pan with a knife, and then crimping with a fork, or crimping with the finger.

Another purpose is to provide a very simple and efficient utensil of this character constructed of sheet metal and comprising a base having a flange at right angles thereto with an arcuate shaped cutting edge, in combination with an arcuate shaped corrugated pie engaging piece, so that after the bottom and top layers of dough with the pie ingredients between them are placed in the pan, the crimper and cutter may be moved around the edge of the pie plate, in order to remove the edges of the dough, and at the same time crimp the upper dough against the lower layer of dough.

A still further purpose is the provision of a device of this character which has been found practical, and efficient in operation, and may be manufactured for a relatively low cost and sold at a reasonable profit.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view showing the application of the combined crimper and cutter, showing the same constructed in accordance with the invention.

Fig. 2 is an enlarged detail perspective view of the combined crimper and cutter.

Fig. 3 is a cross sectional view on line 3—3 of Fig. 2.

Fig. 4 is a sectional view on line 4—4 of Fig. 2.

Fig. 5 is a detail view of the blank from which the base, socket and right angle extension of the utensil are constructed.

Referring to the drawings, 1 designates a piece of sheet metal rolled or bent upon itself to form a socket 2 for the reception of a handle 3. The parts of the sheet metal beyond the roll or sleeve (which forms the socket of the utensil) extend laterally, and are designated by the numeral 4 constituting a base. One of these lateral parts has an extension 5, which is in the form of a segment, and is provided with an arcuate shaped cutting edge 6. This extension is bent laterally relatively to its part 4, and its cutting edge is employed for cutting the superfluous dough of the upper and lower layers of the pie from around the edge of the pie plate.

In order to crimp the upper layer of dough to the lower layer of dough of the pie, a piece of sheet metal of suitable length is first folded on one of its edges as shown at 7, to form a flange, which is bent against the body of the strip of sheet metal, after which the metal is formed or bent to provide a plurality of corrugations 8. The corrugated strip of sheet metal is then disposed in an arcuate shape as illustrated, and has its ends fastened by solder or the like under flanges 9 at the ends of the base of the socket. It will be noted that the ends of the base where the flanges 9 are formed are arranged on inclinations relatively to the right angle bent extension of the base, so that when the corrugated strip is fastened in position, the lower edges of the corrugations will extend at inclinations relatively to the right angle bent extension, in order to permit the utensil to be better manipulated by the pie maker or operator. The edge of the corrugated strip opposite the edge having the overlying flange, is soldered or otherwise fastened at 10 to the right angle bent extension of the base, in order to provide a rigid structure. Furthermore it will be noted that the arcuate shaped cutting edge of the right angle extension extends below the corrugations, so as to overlie the marginal edge of the pie plate, for removing the superfluous dough, while the corrugations will impart impressions in the surface of the dough to give the dough a crimping appearance.

Referring to Fig. 5 it will be noted that the socket, the base and the right angle extension are all constructed from a single piece of sheet metal, the blank of such parts being illustrated. Such blank has indicated thereon by dot and dash lines 11 where the blank is bent or curved, to form the socket, the base and the right angle extension.

The invention having been set forth, what is claimed, as being useful is:

1. As an article of manufacture, a pie crimper comprising a base having a right angle extension provided with an arcuate cutting edge, a socket on the base for the reception of a handle, and an arcuate shaped pie crimping surface secured to the under face of the base conforming to the arcuate cutting edge of the extension and offset a short distance therefrom, whereby the pie crust may be crimped and the superfluous dough removed from around the edge of the pie plate as the crimper is moved step by step around the edge of the pie.

2. In a device of the character and for the purpose indicated, a base having a socket for a handle and provided with an extension disposed at right angles to the base, said extension having an arcuate cutting edge, and a corrugated member secured to the base and disposed arcuately concentrically with the cutting edge, said corrugated member being disposed on an inclination relatively to the extension and offset from the cutting edge, whereby the superfluous dough can be cut away from around the edge of the pie and the upper surface of the pie crimped at the same time.

3. In a device of the character and for the purpose set forth, a base having flanges at its ends and provided on one of its longitudinal edges with an extension disposed at right angles to the base, said extension having an arcuate cutting edge, a corrugated member of arcuate shape having its ends secured under the end flanges and one of its longitudinal edges secured to the inner face of the extension in a position offset from the cutting edge, whereby the superfluous dough may be cut and the upper surface of the edge of the pie crimped at the same time, and a handle carried by the base.

In testimony whereof I hereunto affix my signature.

ROBERT H. F. STAGGE.